United States Patent
Wege et al.

(10) Patent No.: US 6,649,723 B1
(45) Date of Patent: Nov. 18, 2003

(54) VINYLCYCLOHEXANE-BASED POLYMERS

(75) Inventors: Volker Wege, Neuss-Rosellen (DE); Friedrich-Karl Bruder, Krefeld (DE); Konstadinos Douzinas, Köln (DE); Yun Chen, Krefeld (DE)

(73) Assignees: Bayer Aktiengesellschaft, Leverkusen (DE); Teijin Ltd., Osaka (JP)

( * ) Notice: Subject to any disclaimer, the term of this patent is extended or adjusted under 35 U.S.C. 154(b) by 0 days.

(21) Appl. No.: 10/009,034

(22) PCT Filed: May 2, 2000

(86) PCT No.: PCT/EP00/03926
§ 371 (c)(1),
(2), (4) Date: Mar. 4, 2002

(87) PCT Pub. No.: WO00/69920
PCT Pub. Date: Nov. 23, 2000

(30) Foreign Application Priority Data

May 12, 1999  (DE) .......................................... 199 21 941

(51) Int. Cl.$^7$ ................................................. C08F 32/02
(52) U.S. Cl. ........................ 526/308; 526/348; 526/335; 526/346
(58) Field of Search ................................ 526/308, 348, 526/335, 346

(56) References Cited

U.S. PATENT DOCUMENTS 4,911,966 A * 3/1990 Murayama et al. ............ 428/64
6,447,868 B1 * 9/2002 Sekiguchi et al. ......... 428/64.1

FOREIGN PATENT DOCUMENTS

| DE | 19 756 368 | 7/1999 |
| EP | 0 317 263  | 5/1989 |
| GB | 933127     | 8/1963 |
| GB | 933596     | 8/1963 |
| WO | 99/05210   | 2/1999 |

* cited by examiner

Primary Examiner—Ling-Siu Choi
(74) Attorney, Agent, or Firm—Joseph C. Gil; Aron Preis; Gary F. Matz

(57) ABSTRACT

A molding composition comprising a (co)polymer of vinylcyclohexane is disclosed. The copolymer is characterized in having an absolute molecular weight $M_w$ of 100,000 to 450,000 g/mol, polydispersity index of 1 to 3 and maximum melt viscosity of 1000 Pa·s, as measured at 300° C. and at a shear rate of 1000 sec$^{-1}$. The composition is suitable for producing a variety of molded article most notably optical data storage media.

14 Claims, No Drawings

VINYLCYCLOHEXANE-BASED POLYMERS

Compared with polycarbonates, which are currently used for the production of optical data storage media, polymers based on vinylcyclohexane which exhibit satisfactory mechanical properties have a higher viscosity at the same temperature over a broad range of low shear rates.

The accurate moulding of pits which are smaller and disposed more closely together than those cited in EP-A 317 263 and U.S. Pat. No. 4,911,966, and of the grooves which are possible nowadays, is essential for high densities of data storage of >5 Gbytes, particularly >10 Gbytes.

The method of producing polymers based on vinylcyclohexane which is described in EP-A 317 263 and the use thereof as substrates for optical discs result in a molecular weight which is too low compared with that which would ensure the operationally reliable production thereof (comparative example 1). The mechanical properties of the homopolymers described there are not very suitable for the production of optical data storage media.

The method described in U.S. Pat. No. 4,911,966 only results in partially hydrogenated products (<97%), and most of the examples comprise degrees of hydrogenation of <86%. According to the prior art, partially hydrogenated systems exhibit inadequate transparency (DE-AS 11 31 885 (=GB 933 596)). The partially hydrogenated systems which are disclosed are turbid, and are unsuitable for applications as optical substrates which are penetrated by a laser beam. Partially hydrogenated systems also have the disadvantage that their glass transition temperature depends on the degree of hydrogenation. In an industrial process, an adjustment of the degree of hydrogenation and thus of the thermal properties of the optical substrate can only be reproducibly implemented by expending considerable engineering effort and at considerable cost.

Moreover, for the most part the partially hydrogenated products which are cited in U.S. Pat. No. 4,911,966 have a molecular weight which is far too low for the operationally reliable production of substrates for optical data storage media.

The aforementioned patent specifications do not mention the quality of moulding of pit and groove structures or their existence in principle by means of the substrates cited there.

Optimised molecular weights and molecular weight distributions are essential for satisfactory mechanical properties, and at the same time good melt flow properties are essential for the moulding of pit and groove structures of high-density optical data storage media.

A molecular weight which is possibly too high can lead to problems with the moulding of pits and grooves, as a consequence of too high a viscosity.

The substrates according to the present invention, which comprise a polymer based on vinylcyclohexane with a narrow molecular weight distribution or a mixture thereof with a low molecular weight component, are distinguished by their good level of mechanical properties and by their good melt flow properties.

It is thereby possible to produce optical discs in an operationally reliable manner by injection moulding, and the discs can subsequently be handled without their bending or breaking.

Thinner substrates can be produced which have layer thicknesses less than 1.1 mm, of 0.6 mm thickness for example, and which at the same time exhibit satisfactory mechanical properties.

On account of these properties, the materials can be used very satisfactorily as substrates for optical data storage media.

Satisfactory mechanical properties are also required for other optical substrates which do not require mechanical indentations in the form of pits and grooves, for example, and have to be accompanied by a low level of birefringence, a low moment of inertia, a high level of dimensional stability when hot, a high modulus of elasticity, low water absorption and low density. These requirements are also met by the substrates according to the invention.

The present invention relates to polymers of vinylcyclohexane with an absolute molecular weight $M_w$ from 100,000 to 450,000 g/mol or a mixture thereof with a low molecular weight component with an absolute molecular weight from 1000 to less than 100,000 g/mol, wherein the molecular weight distribution is characterised by a polydispersity index (PDI=$M_w/M_n$) of 1 to 3 and the maximum melt viscosity is 1000 Pa·s, as measured at 300° C. and at a shear rate of 1000 sec$^{-1}$.

Any oligomeric fraction with a molecular weight $M_w$ of up to 3000 g/mol which may possibly be present is not taken into account in the calculation of the polydispersivity index.

Any oligomeric fraction with a molecular weight of up to 3000 g/mol which may be present amounts to less than 5% of the weight of the polymer.

The molecular weight $M_w$ of the high molecular weight polymer (homopolymer) preferably ranges from 200,000 to 450,000 gmol$^{-1}$, and ranges in particular from 200,000 to 400,000 gmol$^{-1}$.

The molecular weight $M_w$ of a high molecular weight copolymer or block polymer preferably ranges from 100,000 to 400,000 gmol$^{-1}$, and ranges in particular from 100,000 to 250,000 gmol$^{-1}$.

The molecular weight $M_w$ of the low molecular weight component generally ranges from 1000 to 100,000 gmol$^{-1}$, preferably from 7000 to 90,000 gmol$^{-1}$, most preferably from 10,000 to 90,000 gmol$^{-1}$.

The molecular weight distribution of the respective component is characterised by a polydispersity index (PDI=Mw/Mn) from 1 to 3.

In the case of mixtures, the proportion of low molecular weight component with respect to the weight of the mixture of high molecular weight and low molecular weight polymers generally amounts to up to 70% by weight, preferably 5 to 60% by weight, most preferably 10 to 50% by weight.

A polymer based on vinylcyclohexane is preferred both for the high molecular weight and for the low molecular weight component. This polymer comprises a recurring structural unit of formula (I)

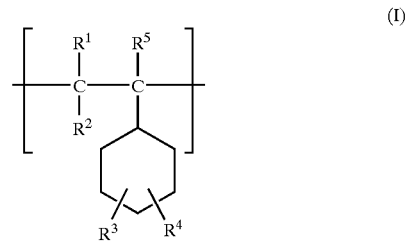

wherein $R^1$ and $R^2$, independently of each other, denote hydrogen or a $C_1$–$C_6$ alkyl, preferably a $C_1$–$C_4$ alkyl, $R^3$ and $R^4$, independently of each other, represent hydrogen or a $C_1$–$C_6$ alkyl, preferably a $C_1$–$C_4$ alkyl, particularly methyl and/or ethyl, or $R^3$ and $R^4$ jointly represent an alkylene, preferably a $C_3$ or $C_4$ alkylene (comprising a condensed-on 5- or 6-membered cycloaliphatic ring), $R^5$ represents hydrogen or a $C_1$–$C_6$ alkyl, preferably a $C_1$–$C_4$ alkyl, $R^1$, $R^2$ and $R^3$, independently of each other, represent hydrogen or methyl in particular.

Apart from stereoregular head-to-tail linkages, the concatenation of the above structural units can comprise a small proportion of head-to-head linkages. The vinylcyclohexane-based polymer can be branched via centres, and can have a star configuration structure for example.

Comonomers can be contained in an amount which generally ranges from 0 to 80% by weight, preferably from 0 to 60% by weight, most preferably from 0 to 40% by weight, with respect to the finished polymer. Polymers are preferred which comprise recurring structural units of formula (I) and which are formed from one monomer or from a mixture of monomers.

The following substances can preferably be used as comonomers and incorporated in the polymer during the polymerisation of the starting polymer (a polystyrene which is optionally substituted): olefines which generally comprise 2 to 10 C atoms, such as ethylene, propylene, isoprene, isobutylene or butadiene for example, $C_1$–$C_8$, preferably $C_1$–$C_4$ alkyl esters of acrylic or methacrylic acid, unsaturated cycloaliphatic hydrocarbons, e.g. cyclopentadiene, cyclohexene, cyclohexadiene, norbornene which is optionally substituted, dicyclopentadiene, dihydrocyclopentadiene, tetracyclodecene which is optionally substituted, styrenes with alkylated nuclei, α-methylstyrene, divinylbenzene, vinyl esters, vinylic acids, vinyl ethers, vinyl acetate, vinyl cyanides such as acrylonitrile or methacrylonitrile, maleic anhydride, and mixtures of these monomers.

The polymers can have a linear chain structure, or can also comprise branching sites due to co-units (e.g. graft copolymers). The branching centres may comprise star configuration polymers or branched polymers. The polymers according to the invention can comprise other forms of what is a primary, secondary, tertiary or optionally a quaternary polymer structure, such as a helix, a double helix, a folded sheet, etc., or mixtures of these structures.

Homopolymers formed from a monomer corresponding to formula (I) are particularly preferred.

Polymers which are particularly preferred for the high molecular weight component include homopolymers of a monomer corresponding to formula (I), most preferably hydrogenated styrene-isoprene polymers, particularly block copolymers, and can be used either on their own or as a mixture.

Polymers which are particularly preferred for the low molecular weight component include homopolymers of a monomer corresponding to formula (I), (block) copolymers, most preferably hydrogenated styrene-isoprene polymers, particularly hydrogenated styrene-isoprene polymers which comprise 3 to 8, preferably 3 to 5, radial members. The low molecular weight component can be present either as one polymer or as mixtures of said polymers.

The vinylcyclohexane-based polymers can have an atactic, a predominantly syndiotactic or a predominantly isotactic diad configuration.

Amorphous substrates are also preferred which comprise a predominantly syndiotactic configuration of the vinylcyclohexane units and which are characterised in that the amount of diads is greater than 50.1% and less than 74%, most preferably greater than 52% and less than 70%.

Methods of elucidating the microstructure by means of $^{13}C$—$^1H$ correlation spectroscopy of the methylene carbon atoms of a polymer backbone are generally known and are described by A. M. P. Ros and O. Sudmeijer (A. M. P. Ros, O. Sudmeijer, Int. J. Polym. Anal. Charakt. (1997), 4, 39) for example.

The signals of crystalline isotactic and syndiotactic polyvinylcyclohexane are determined by means of two-dimensional NMR spectrometry. In the 2D CH correlation spectrum, the methylene carbon atom (in the polymer backbone) of isotactic polyvinylcyclohexane splits into two separate proton signals, and indicates a purely isotactic diad configuration. Syndiotactic polyvinylcyclohexane, on the other hand, only exhibits one signal for the C 1 carbon atom in the 2D CH correlation spectrum. The amorphous syndiotactic-rich polyvinylcyclohexane according to the invention exhibits an integral excess of intensity of syndiotactic diads compared with the isotactic diad configuration.

VCH polymers are produced by polymerising derivatives of styrene with corresponding monomers, by a radical, anionic or cationic mechanism, or by means of metal complex initiators or catalysts, and by subsequently completely or partially hydrogenating the unsaturated aromatic bonds (see, for example, WO 94/21694, EP-A 322 731).

Polymers based on vinylcyclohexane are produced in particular by the hydrogenation of styrene derivatives which have been polymerised by an anionic or radical mechanism. The polymers according to the invention can comprise bimodal or optionally multimodal distributions over the range of polydispersity considered.

One skilled in the art in the field of anionic and radical polymerisation is aware that the polydispersities of prepolymers can be adjusted between 1 and 3 (Braun, D., Praktikum der makromolekularen organischen Chemie, revised, expanded edition, Heidelberg, Huethig 1979).

The absolute (weight average) molecular weights Mw of the hydrogenated products are determined by light scattering. The absolute (number average) molecular weights Mn are determined by membrane osmosis (vapour pressure osmosis). Another method of characterising the molecular weight distribution by polydispersity is the measurement of the relative molecular weights Mw and Mn by gel permeation chromatography.

The process generally results in practically complete hydrogenation of the aromatic units. As a rule, the degree of hydrogenation is ≧80%, preferably ≧90%, most preferably >99% to 100%. The degree of hydrogenation can be determined by NMR or UV spectrometry, for example.

The melt viscosity is determined by the oscillation method, by means of a melt viscometer of plate and cone construction. The viscosity depends on the shear rate (angular frequency), and the viscosity at 300° C. and 1000 sec$^{-1}$ of the polymers or mixtures according to the invention is generally up to 1000 Pa·s, and preferably ranges from 5 to 500 Pa·s, most preferably from 10 to 200 Pa·s.

The starting polymers are generally known (e.g. WO 94/21 694).

Polymerisation can be conducted continuously, semi-continuously or batch-wise.

The amount of catalyst used for hydrogenation depends on the process employed; the latter can be carried out continuously, semi-continuously or batch-wise.

In a batch process, the ratio of catalyst to polymer is generally 0.3–0001, preferably 0.2–0.005, most preferably 0.15–0.01.

The polymer concentrations with respect to the total weight of solvent and polymer generally range from 80 to 1, preferably 50 to 10, particularly 40 to 15% by weight.

The starting polymer is hydrogenated by methods which are generally known (e.g. WO 94/21 694, WO 96/34 895, EP-A-322 731). A multiplicity of known hydrogenation catalysts can be used as catalysts. Examples of preferred metal catalysts are cited in WO 94/21 694 or WO 96/34 896. Any catalyst which is known for hydrogenation reactions can be used. Suitable catalysts include those with a large surface area (e.g. 100–600 m²/g) and a small average pore diameter (e.g. 20–500 Å). Other suitable catalysts include those with a small surface area (e.g. ≧10 m²/g) and large average pore diameters which are characterised in that 98% of the pore volume comprises pores with pore diameters larger than 600 Å (e.g. about 1000–4000 Å) (see, for example, U.S. Pat. No. 5,654,253, U.S. Pat. No. 5,612,422, JP-A 03076706). Raney nickel, nickel on silica or on silica/alumina, nickel on carbon as a support, and/or noble metal catalysts e.g. Pt, Ru, Rh, Pd, are used in particular.

The reaction is generally conducted at temperatures between 0 and 500° C., preferably between 20 and 250° C., particularly between 60 and 200° C.

The solvents which are customarily used for hydrogenation reactions are described in DE-AS 1 131 885 for example (see above).

The reaction is generally conducted at pressures from 1 bar to 1000 bar, preferably from 20 to 300 bar, particularly from 40 to 200 bar.

The vinylcyclohexane-based polymers or copolymers according to the invention are of excellent suitability for the production of optical data storage media, preferably those with densities of data storage >5 Gbyte, particularly >10 Gbyte, with respect to a disc of 120 mm diameter.

Additives, such as stabilisers and demoulding agents for example, can be added to the vinylcyclohexane-based polymers or (block) copolymers.

Examples of optical data storage media include:
magneto-optical disc (MO disc)
mini-disc (MD)
ASMO (MO-7) ("advanced storage magneto-optic")
DVR (12 Gbyte disc)
MAMMOS ("magnetic amplifying magneto-optical system")
SIL and MSR ("solid immersion lens" and "magnetic super-resolution")
CD-ROM (read only memory)
CD, CD-R (recordable), CD-RW (rewritable), CD-I (interactive), photo-CD super audio CD
DVD, DVD-R (recordable), DVD-RAM (random access memory);
DVD=digital versatile disc
DVD-RW (rewritable)
PC+RW (phase change and rewritable)
MMVF (multimedia video file system).

Moreover, due to their outstanding optical properties the polymers according to the invention are particularly suitable for the production of optical materials. e.g. for lenses, prisms, mirrors, colour filters, etc., and are also suitable as media for holographic images (e.g. for cheque cards, credit cards, passes, and for three-dimensional holographic images). The materials can be used as transparent media on which three-dimensional structures can be inscribed, e.g. three-dimensional structures from focused coherent radiation (LASER), and can be used in particular as three-dimensional data storage media or for the three-dimensional imaging of objects.

EXAMPLES

Production

Examples 1–4

Hydrogenated Polystyrene (h-PS)

A 40 litre autoclave was flushed with inert gas (nitrogen). The polymer solution and catalyst were added (Table 1).

After closing the autoclave, it was repeatedly pressurised with an inert gas and was then pressurised with hydrogen. After releasing the pressure, the respective hydrogen pressure was set and the batch was heated with stirring to the corresponding reaction temperature. After the absorption of hydrogen had commenced, the reaction pressure was held constant. The reaction time was defined as the period from heating up the batch until the time at which the hydrogen atoms approached their saturation value.

After completion of the reaction, the polymer solution was filtered. The stabiliser was added, and the product was freed from solvent at 240° C. and was processed further as a granular material (Examples 1 to 4, Table 1).

The molecular weights listed in Table 2 can be achieved by the reaction conditions employed, particularly the temperature (Table 1), and by the subsequent work-up conditions (temperature of evaporation of solvent, type of stabiliser and the concentration thereof).

Example 5

Production of Poly(styrene-block-co-isoprene)

These syntheses were carried out using standard inert gas techniques. 138 kg abs. cyclohexane were placed in a 250 litre reactor. 6.3 kg abs. styrene were introduced into the reactor at room temperature. The temperature was raised to 55° C. and 102 ml (0.255 mol) n-butyllithium (a 23% solution in n-hexane) were introduced into the reactor. The reaction mixture was heated to 70° C. and was stirred for 30 minutes.

1.4 kg abs. isoprene and 6.3 kg abs. styrene were simultaneously introduced into the reactor. The mixture was held at 70° C. for 2 hours. The reaction solution was cooled to room temperature and a solution of 10 g 2-propanol in 500 g cyclohexane was added. The polymer solution was concentrated to 16.6% by weight at 40 to 45° C. under vacuum.

Example 6

Production of Hydrogenated Poly(styrene-block-co-isoprene)

22 kg of the polymer solution (Example 5) were transferred under nitrogen to a 40 litre autoclave. After adding 421.5 g Ni 5 136 P (Engelhard), the autoclave was repeatedly pressurised with nitrogen and hydrogen. The reaction solution was heated at 100 bar to 170° C. After the heat-up phase, the reaction was conducted at 150 bar, as controlled by an automated pressure device, until constant pressure was achieved, and the batch was stirred for a further two hours.

The catalyst was filtered from the polymer solution. The polymer solution was stabilised with 4000 ppm Irganox XP 420 FF, was freed from solvent at 240° C. and was processed further as a granular material.

Example 7

Production of Star Configuration Poly(styrene-block-co-isoprene)

1200 g cyclohexane, 800 g methyl-tert.-butyl ether and styrene (350 g, 3.37 mol) were transferred into a 5 litre steel autoclave. Butyllithium (1.24 g, 19.3 mmol) was added to the solution with stirring at room temperature (25° C.). Polymerisation was conducted for 1.5 hours at this temperature. Thereafter, isoprene (53 g, 0.77 mmol) was added to the polymer solution. After 1.5 hours, tetramethoxysilane (0.61 g, 4 mmol) was added as a 7.5% by weight solution in cyclohexane to the block copolymer solution. Concatenation to form the star configuration polymer was effected at 80° C. for 3 hours. Thereafter, 5 ml isopropanol were added.

Example 8

Production of Hydrogenated Star Configuration Poly(styrene-block-co-isoprene)

Nickel on silica/alumina (Aldrich) was added to the polymer solution (Example 7), which was then transferred to a 5 litre autoclave. The latter was repeatedly rendered inert with nitrogen. After depressurisation, the hydrogen pressure was set at 100 bar and the batch was heated to 180° C. and held at this temperature for 6 hours. Each time the pressure fell to 80 bar, it was increased to 100 bar again. After completion of the reaction, the batch was cooled to room temperature, the catalyst was separated from the polymer solution by filtration, and the polymer was dried under vacuum.

Example 9

Production of a Blend of Hydrogenated Polystyrene and Hydrogenated, Star Configuration Poly(styrene-block-co-isoprene)

The polymer (Example 8) was dissolved, as a 20% solution, in cyclohexane/methyl-tert.-butyl ether in a ratio of 2/1, was treated with the stabiliser Irganox XP 420 FF and was mixed with a solution of the hydrogenated polystyrene (Example 4) in a ratio of polymers of 50/50. The solvent was removed under vacuum and the dried polymer was processed in an extruder to form granules.

The granules were processed to form moulded blanks by a CD injection moulding process (Table 4).

TABLE 1

Hydrogenation of polystyrene

| Example No. | Weight of polymer[2] (kg) | Solvent (liters) | Weight of catalyst (g) | Reaction temp. (° C.) | Hydrogen pressure (bar) | Reaction time (hours) | Degree of hydrogenation[1] (%) | Stabiliser (ppm) |
|---|---|---|---|---|---|---|---|---|
| 1 | 5.0 | 151 cyclohexane 101 methyl-t-butyl ether | 625[3] | 180 | 100 | 9.7 | 100 | 2500 Irganox* B 561 |
| 2 | 5.0 | 151 cyclohexane 101 methyl-t-butyl ether | 625[3] | 160 | 100 | 16.5 | 100 | 2500 Irganox* B 561 |
| 3 | 4.8 | 151 cyclohexane 9.11 methyl-t-butyl ether | 625[4] | 160 | 100 | 17.5 | 100 | 4000 Irganox* XP420 FF |
| 4 | 4.8 | 151 cyclohexane 1.11 methyl-t-butyl ether | 625[4] | 160 | 100 | 19 | 100 | Irganox* XP 420 FF |

[1] determined by $^1$H NMR spectrometry
[2] polystrene Type 158 k, transparent, Mw 280,000 g/mol, BASF AG, Ludwigshafen, Germany
[3] Ni/SiO$_2$/Al$_2$O$_3$, 64–67% nickel, Aldrich
[4] Ni/SiO$_2$/Al$_2$O$_3$, Ni-5136 P, Engelhard, De Meern, Holland
*The stabilisers were commercial products of Ciba, Basle, Switzerland.

TABLE 2

Molecular weights Mn, Mw; PDI; and pit or groove moulding whilst simultaneously complying with the mechanical requirements for CD injection moulding

| Example No. | Average molecular weight Mn[1] (10$^3$ g/mol) | Average molecular weight Mw[2] (10$^3$ g/mol) | Polydispersity PDI | Maximum processing temperature at die outlet (° C.) | Mould temperature (° C.) | Cracks in optical substrate (+/−) | Pit depth[3] (mm) |
|---|---|---|---|---|---|---|---|
| 1 A comparative | 91.2 | 191.5 | 2.1 | 330 | 85 | + | 92 |
| 2 B according to the invention | 109.8 | 238.4 | 2.2 | 315 | 70 | − | 110 |

TABLE 2-continued

Molecular weights Mn, Mw; PDI; and pit or groove moulding whilst simultaneously complying with the mechanical requirements for CD injection moulding

| Example No. | Average molecular weight Mn[1] ($10^3$ g/mol) | Average molecular weight Mw[2] ($10^3$ g/mol) | Polydispersity PDI | Maximum processing temperature at die outlet (° C.) | Mould temperature (° C.) | Cracks in optical substrate (+/−) | Pit depth[3] (mm) |
|---|---|---|---|---|---|---|---|
| 3 A according to the invention | 107.3 | 267.2 | 2.5 | 335 | 85 | − | 82 |
| 4 C according to the invention | 108.0 | 259.0 | 2.4 | 350 | 85 | − | 75 |
| 6 C according to the invention | 96.8 | 121.3 | 1.25 | 315 | 75 | − | 80 |
| 4 A according to the invention | 108.0 | 259.0 | 2.4 | 320 | 100 | − | 122 |
| 9 A[5] Mixture according to the invention | 54.5[4]/108.0 | 62.0[4]/259.0 | 1.1/2.4 | 320 | 100 | − | 140 |

A = Standard digital versatile disc die, substrate produced by means of Nestal Disjet 600
B = Standard compact disc die, substrate produced by means of Nestal Disjet 600
C = High density digital versatile die with 93 mm pit depth as measured
PDI = Polydispersity
[1]Absolute molecular weights Mn from the measured correlation of the GPC values of the vinylcyclohexane-based polymers with molecular weights determined by membrane osmosis
[2]Absolute molecular weights Mw from the measured correlation of the GPC values of the vinylcyclohexane-based polymers with molecular weights determined by light scattering
[3]determined by scanning force microscopy (AFM)
[4]molecular weights Mn and Mw of the prepolymer as measured by GPC
[5]50/50 blend Various pit depths can be obtained in an injection moulding or injection embossing process depending on the depths of the pits and grooves of the die used. The pit depth or groove depth can be varied by adjustments to the apparatus, by the mould temperature and by the melting temperature of the polymer.

Example 1A (Table 2) illustrates good pit moulding of the vinylcyclohexane-based polymer. However, the Substrates of optical data storage media which were produced by injection moulding comprised fissures (termed cracks or microcracks). The materials which are characterised in Examples 2B and 3C could be produced without the occurrence of cracks or microcracks. The vinylcyclohexane-based polymers according to the invention constitute ideal optical substrates, which at the same time facilitate good pit or groove moulding at low die temperatures without the occurrence of cracks.

Both Example 4C (homopolymer) and Example 6C (copolymer) illustrate good pit replication (75 nm/80 nm) at low mould temperatures, without the formation of cracks. Moreover, Example 6C (copolymer) illustrates excellent pit replication at low processing and die temperatures.

Example 9A (a blend of a high molecular weight polymer and a low molecular weight component) also illustrates excellent pit replication without crack formation.

The CD substrates according to the invention can be produced without cracks with enhanced operational reliability compared with example 1 A.

What is claimed is:

1. Polymers of vinylcyclohexane with an absolute weight average molecular weight $M_w$ from 100,000 to 450,000 g/mol combined with a low molecular weight component based on vinylcyclohexane with an absolute weight average molecular weight from 1000 to less than 100,000 g/mol, wherein the molecular weight distribution is characterized by a polydispersity index of 1 to 3 and the maximum melt viscosity is 1000 Pa·s, as measured at 300° C. and at a shear rate of 1000 sec$^{-1}$.

2. The mixture according to claim 1, containing, as a vinylcyclohexane-based polymer, a polymer comprising a recurring structural unit of

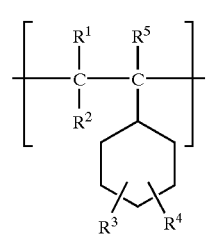

formula (I)
Wherein
$R^1$ and $R^2$, independently of each other, denote hydrogen or a $C_1$–$C_6$ alkyl,
$R^3$ and $R^4$, independently of each other, denote hydrogen or a $C_1$–$C_6$ alkyl or jointly represent an alkylene,
$R^5$ represents hydrogen or a $C_1$–$C_6$ alkyl,
and optionally containing at least one comonomer selected from the group consisting of olefins containing 2 to 10 C atoms, $C_1$–C4 alkyl esters of acrylic acid, alkyl esters of methacrylic acid, unsaturated cycloaliphatic hydrocarbons, tetracyclodecenes which are optionally substituted, divinylbenzene, vinyl esters, vinyl acids, vinyl actates and vinyl cyanides.

3. The mixture according to claim 1, wherein the high molecular weight components exist as homopolymers, copolymers or block copolymers.

4. The mixture according to claim 1, wherein the proportion of low molecular weight component with respect to the weight of the mixture of high and low molecular weight components amounts to up to 70% by weight.

5. Moldings according to claim 1.

6. An optical substrate containing the mixture according to claim 1.

7. A molding composition comprising a (co)polymer of vinylcyclohexane having an absolute molecular weight $M_w$ of 100,000 to 450,000 g/mol and at least one low molecular weight polymer of vinylcyclohexane having an absolute molecular weight of 1,000 to less than 1000,000 g/mol, wherein the composition has polydispersity index of 1 to 3 and maximum melt viscosity of 1,000 Pa·s, as measured at 300° C. and at a shear rate of 1,000 sec$^{-1}$.

8. The composition of claim 7 wherein (co)polymer contains the recurring structural unit of formula

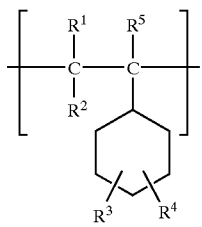

(I)

wherein $R^1$ and $R^2$, independently of each other, denote hydrogen or a $C_1$–$C_6$ alkyl, $R^3$ and $R^4$, independently of each other, denote hydrogen or a $C_1$–$C_6$ alkyl, or jointly represent an alkylene, $R^5$ represents hydrogen or a $C_1$–$C_6$ alkyl.

9. The composition of claim 7 wherein the (co)polymer is the product of polymerization of at least one comonomer selected from the group consisting of olefins containing 2 to 10 C atoms, $C_1$–$C_4$ alkyl esters of acrylic acid, $C_1$–$C_4$ alkyl esters of methacrylic acid, unsaturated cycloaliphatic hydrocarbons, tetracyclododecenes, divinylbenzene, vinyl esters, vinyl acids, vinyl ethers, vinyl acetates and vinyl cyanides.

10. The composition of claim 7 wherein (co)polymer is a block copolymer.

11. The composition of claim 7 wherein the low molecular weight polymer of vinylcyclohexane is present in an amount of up to 70% relative to the weight of the composition.

12. An optical material comprising the composition of claim 7.

13. The optical material of claim 12 wherein the optical material is an optical data storage medium.

14. A molded article comprising the composition of claim 7.

* * * * *